Figure 1:
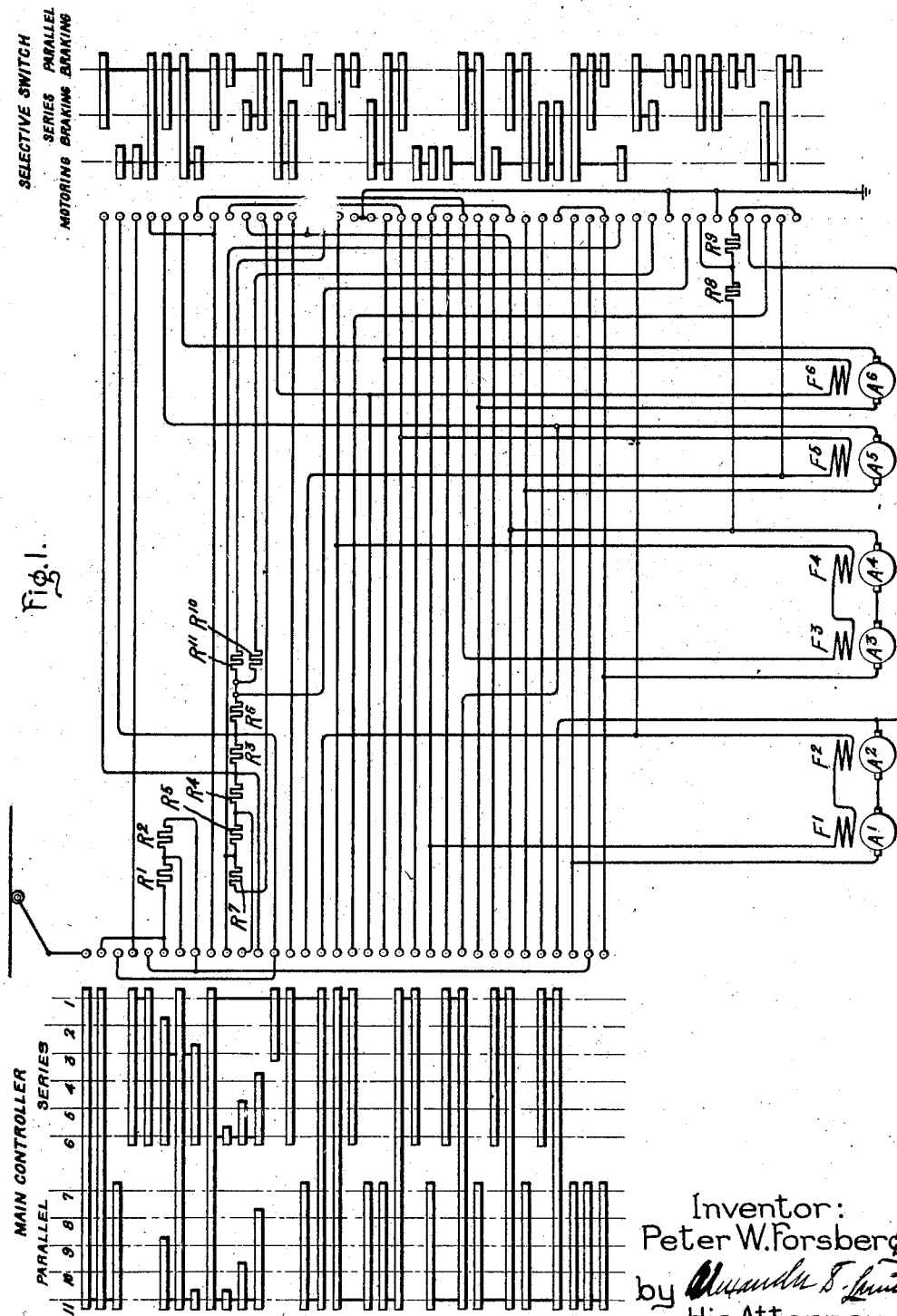

Aug. 28, 1923.

P. W. FORSBERG 1,466,584

POWER TRANSMISSION AND ELECTRIC BRAKING

Filed Nov. 11, 1922  2 Sheets-Sheet 1

Inventor:
Peter W. Forsberg,
by
His Attorney.

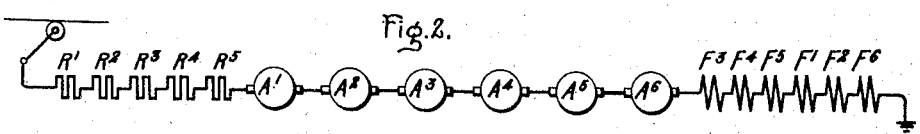
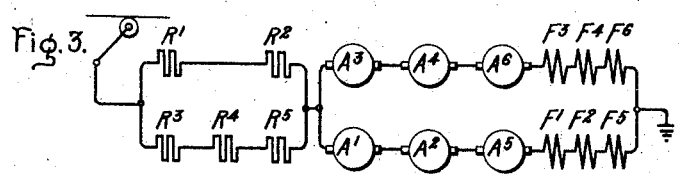
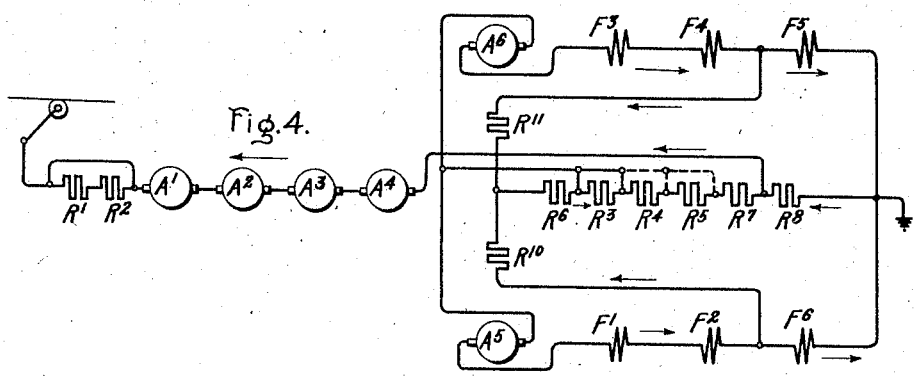
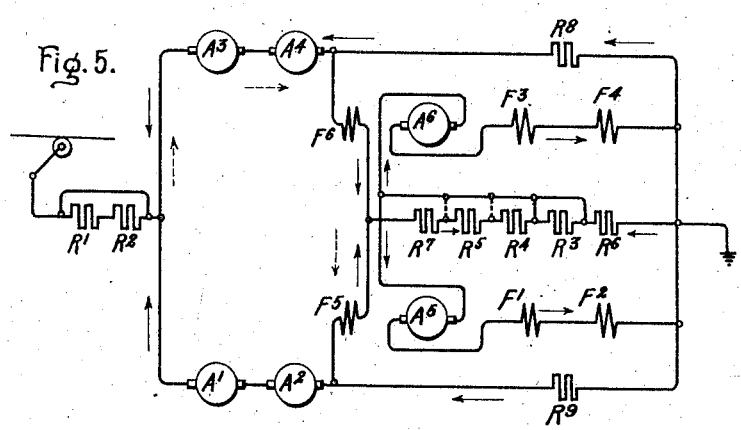

Patented Aug. 28, 1923.

1,466,584

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

POWER TRANSMISSION AND ELECTRIC BRAKING.

Application filed November 11, 1922. Serial No. 600,426.

*To all whom it may concern:*

Be it known that I, PETER W. FORSBERG, a citizen of the United States, residing at Schenectady, in the county of Schenectady, State of New York, have invented certain new and useful Improvements in Power Transmission and Electric Braking, of which the following is a specification.

My invention relates to systems of control for dynamo electric machines and, in particular, it relates to systems wherein the dynamo electric machines either operate as motors to drive a load or are driven by the load and operate as generators to retard the load.

Although not limited to such use, the invention has a particular usefulness in the control of the electric driving motors of an electric vehicle, such, for instance, as an electric locomotive or the like.

In certain of its aspects, my invention is directed to a further development of the invention in power transmission and electric braking for which I obtained a Patent No. 1,421,931, dated July 4, 1922. In the said patent there are shown, described and broadly claimed several improved arrangements employing a plurality of dynamo electric machines, a portion of which is used as an exciter for exciting the field windings of the remainder of the machines for electric braking. The invention of my said patent is shown and described in connection with arrangements in which a single dynamo electric machine serves as the exciter for the remainder of the machines for electric braking in order to explain briefly and clearly the broad principles thereof. Under certain circumstances, as for example where particular speeds of braking operation are desired, it is desirable to use at least two of the machines as exciters for the remainder of the machines. Provision is then desirable for coordinating the action of the exciters and the braking machines so as to properly control the braking effect.

One of the objects of my invention is to provide a simple and effective control system for electric braking in which at least two of the dynamo electric machines serve as exciters for the remainder of the machines.

Another object of the invention is to provide a simple and effective arrangement whereby the exciters are connected in multiple with each other and the operation of the exciters is coordinated so that they cooperate effectively in the control of the braking current.

Another object of the invention is to provide simple and effective means whereby compensation is provided for variations in the generated potential of the braking machines and of the exciters.

Another object of the invention is that the compensation for variations in the generated potential of the machines shall be the inherent effect of the connections between the machines.

These and further objects of the invention as will be fully set forth hereinafter, and as will be apparent to those skilled in the art from an understanding of the invention, are attained by the systems shown in very simplified diagram in the accompanying drawings.

For an understanding of the principles of the invention, reference is had to the accompanying drawings wherein I have illustrated my invention in very simplified diagrams in order that a quick and easy understanding of the invention may be had.

Referring to the drawings, Figure 1 shows a system of control for a plurality of dynamo electric machines intended to either operate as series motors to drive a load or as generators to retard the load by electric braking; Fig. 2 is a simplified diagram of the connections established for series motoring; Fig. 3 is a very simplified diagram of the connections established for "parallel" motoring; Fig. 4 is a very simplified diagram of the connections established for "series" braking in which two of the dynamo electric machines are connected so as to operate as self-excited exciters for the remainder of the machines; and Fig. 5 is a very simplified diagram of the connections established for "parallel" braking in which two of the dynamo electric machines are connected in multiple relation with each other so that each of the machines operates as an exciter for a separate portion of the remainder of the machines, the said separate portions of the remainder of the machines being connected in a parallel relation with each other.

Referring to Fig. 1, the dynamo electric machines are shown as of the series type having armatures $A^1$ to $A^6$ inclusive and respective series fields $F^1$ to $F^6$ inclusive. These machines are arranged to be controlled by means of a main controller which is indicated as such on the drawing and a selective switch which is also indicated as such on the drawing. The main controller has an off position and a plurality of operative positions, a portion of the positions being for series relation of the controlled machines and a portion of the positions being for parallel relation of the controlled machines as indicated on the controller. The selective switch is provided with an "off" and three operative positions. In the first operative position, connections are established for motoring operation of the dynamo electric machines, in the second position connections are established as indicated in Fig. 4 for "series" braking, and in the final operative position connections are established for "parallel" braking. It will be understood that if motoring operation is desired, the selective switch will be thrown to its motoring position and then the main controller operated through its successive operative positions. In the initial operative positions of the main controller, the machines will be connected in series relation as shown in Fig. 2, and in the final operative positions of the main controller, the machines will be connected in parallel relation as shown in Fig. 3. The resistors $R^1$ to $R^{11}$ inclusive are provided for controlling the speed of the machines during motoring and also for controlling the braking effect during braking operations. It is believed that those skilled in the art will readily understand the connections established by the operation of the selective and the main controller without a detailed description thereof, and it is to be here noted that while the arrangement is shown as one in which the main controller and selective switch establish directly the machine circuits, I contemplate that the invention will be embodied in remote control arrangements. It is believed that a clear understanding of the invention will be had from a description of Figs. 4 and 5 which disclose the essence of my invention.

It will be understood that in any practical system of control various interlocking connections will be required between the selective switch and the main controller in order that the proper coordination of these two devices may be had. However, the present invention is not limited to any particular set of interlocking connections and those skilled in the art will readily provide suitable interlocking connections from an understanding of my prior Patent No. 1,421,931 above referred to.

Reference is now particularly had to Fig. 4 in which similar reference numerals designate similar parts of the apparatus shown in Figs. 1, 2 and 3. In order to establish the connections as shown in Fig. 4, the selective switch, Fig. 1, is first thrown to the "series" braking position and the main controller is moved toward the right through its successive "series" positions. As before stated, suitable interlocking connections will be necessary in order to prevent moving the main controller through the "series" position to the "parallel" position when braking operations are desired. In the arrangement of Fig. 4, the dynamo electric machines having armatures $A^5$ and $A^6$ and field windings $F^5$ and $F^6$ respectively are connected so as to operate as exciters for the remainder of the dynamo electric machines— the machines have armatures $A^1$ to $A^4$ inclusive and field windings $F^1$ to $F^4$ inclusive. The exciter $A^6$ is connected in a local circuit with the field windings $F^3$ and $F^4$ and the field winding $F^5$ of the other exciter. The exciter $A^5$ is connected in a local circuit with the field windings $F^1$, $F^2$ and the field winding $F^6$ of the exciter $A^6$. These exciters are individually each connected in a manner set forth fully and broadly claimed in my said prior patent. The balancing or compensating resistor $R^8$ is included in the braking circuit which comprises the armatures $A^1$ to $A^4$ inclusive. This resistor is provided for varying the excitation of the exciters responsively to the value of the braking current. The resistors $R^6$, $R^3$, $R^4$, $R^5$ and $R^7$ are under the control of the main controller (Fig. 1) so as to vary at will the excitation of the exciter fields $F^5$ and $F^6$ so as to thereby control the braking effect of the machines in the manner fully described and broadly claimed in my prior patent. It will be observed in this connection that I have arranged the circuits in such a manner that a single variable resistance comprising the resistors $R^6$, $R^3$, $R^4$, $R^5$ and $R^7$ regulates the braking effect at the will of the operator for both of the exciters simultaneously, thereby obtaining a simplification and reliability of operation, as will be fully apparent to those skilled in the art. It will also be noted that the excitation of both exciters is varied automatically and simultaneously by the voltage drop across the resistor $R^8$. One of the principal difficulties in connecting up armatures in parallel is to balance the two parallel circuits so that there is no interchange of current between the armatures. This difficulty is overcome in the arrangement shown in Fig. 4 by connecting the fields in such a manner that when one exciter armature attempts to generate a higher potential than the other exciter armature, the field of the other armature is strengthened and its own field winding weakened, thereby balancing the circuit. While conditions are normal, the direction of the current will be as shown by the arrows. If armature 5 should have a higher voltage than armature 6, it would tend to force current through two paths, one path through resistances $R^{10}$ and $R^{11}$ to armature 6, and the other path through exciter fields $F^6$ and $F^5$. Because of the fact that the current through the exciter fields is responsive to the voltage drop across the respective resistors $R^{10}$ and $R^{11}$, if current flows from armature 5 to armature 6 through the circuit $R^{10}$, $R^{11}$, it will be noted that the I. R. drop of $R^{10}$ increases, while that of $R^{11}$ decreases, thereby increasing the field $F^6$ and decreasing the excitation of field $F^5$, causing $A^6$ to generate a higher potential and $A^5$ to generate a lower potential, thereby balancing the circuit. Furthermore, because of the fact that field $F^5$ is in a local circuit with $A^6$ and $F^6$ is in a local circuit with $A^5$, the voltage of one exciter controls the excitation of the other. If there is an exchange of current between the exciter fields, the field of one exciter is strengthened and the field of the other exciter is weakened so that a balance is brought about.

In order to obtain a certain range of speeds for the machines which is practical for the conditions of grade, etc. encountered during braking operation, it is sometimes necessary to provide a "parallel" braking arrangement as shown in Fig. 5. The connections as shown in this figure are those which are established by the operation of the selective switch (Fig. 1) and the main controller. The selective switch will be thrown to the "parallel" braking position as indicated and when the main controller is advanced from its off position to an operative position within the range designated as "series," the connections of the machines will be as shown in Fig. 5.

Referring to Fig. 5, it will be observed that the machine having armature $A^6$ and field $F^6$, operates as a self excited exciter and has its armature connected in series with the fields $F^3$ and $F^4$ in a local circuit to the resistor $R^8$ which is included in the braking circuit comprising the armatures $A^3$ and $A^4$. The excitation for the fields $F^1$ and $F^2$ is furnished by the machine having an armature $A^5$ and field $F^5$ which also operates as a self excited exciter. It will be noticed that the armature $A^5$ is connected in a local circuit to the resistor $R^9$ which is included in the braking circuit in which the armatures $A^1$ and $A^2$ are included. A variable resistance, comprising the resistors $R^7$, $R^5$, $R^4$ and $R^3$, simultaneously controls the excitation of the two exciters, in a manner similar to that explained in connection with Fig. 4. A simplification is effected in that a single variable resistance functions to regulate at the will of the operator the braking effect of the system. It will be noticed that the field $F^6$ is connected in shunt to the resistor $R^8$ and the field $F^5$ is connected in shunt to the resistor $R^9$, and that moving the main controller throughout its successive series positions will introduce more or less of the resistors $R^3$, $R^4$, $R^5$ and $R^7$ in the field circuits of the exciters, thereby controlling at will the braking effect. The resistor $R^6$ is connected in the circuit in such a manner that the main controller will not short circuit this section of the resistance. This is for the purpose of insuring that the main controller cannot be operated to cut out all resistance in the exciter field circuits and thereby produce an excessive braking effect. The resistor $R^8$, included in the one branch of the parallel braking circuit, will automatically control the excitation of the field $F^6$ so as to regulate the excitation of the exciter $A^6$ in accordance with the current in this branch of the braking circuit. Likewise the resistor $R^9$ automatically regulates the value of the current through the field $F^5$ in accordance with the current in the other branch of the braking circuit. In the arrangement as shown in Fig. 5, it is necessary to not only balance the loads on the exciters $A^5$, $F^5$, and $A^6$, $F^6$, but also to balance the regenerative current through the different separate regenerative circuits which are connected in parallel. The connections between the exciter fields $F^5$ and $F^6$ are such that this automatic regulation is inherent in the connections. If the armatures $A^1$ and $A^2$ generate a higher voltage than the armatures $A^3$ and $A^4$, there will be an exchange of current from the armature $A^1$ through the armatures $A^3$ and $A^4$, exciter field $F^6$ and exciter field $F^5$. The full line arrows shown on the drawing indicate the normal direction of the current in the various paths of the circuit during braking operation while the circuits are in balance. The exchange of current between the armatures $A^1$—$A^2$ and $A^3$—$A^4$ when the armatures $A^1$—$A^2$ are generating a higher voltage than the armatures $A^3$—$A^4$ is indicated in dotted lines on the figure. It will be observed that this exchange current has the effect of strengthening the field $F^6$ and weakening the field $F^5$, thus automatically establishing very quickly a balance between the two circuits. Likewise in case the armatures $A^3$—$A^4$ generate a higher voltage than the armatures $A^1$—$A^2$, there will be an interchange of current between these armatures which will cause the strengthening of the exciter field $F^5$ and the weakening of the exciter field $F^6$ until a balance is promptly restored. If the exciter armature $A^6$ generates a higher voltage than armature $A^5$, it will cause the armatures $A^3$ and $A^4$ to generate a higher voltage and likewise an increase of the voltage of exciter $A^5$ will cause the armatures $A^1$ and $A^2$ to generate a higher voltage.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a system of control for electric braking, a plurality of dynamo electric machines, at least two of said machines connected to operate as exciters for the remainder of the machines, each of said exciters connected in a separate local circuit with a substantially equal part of the field windings of said remainder of the machines, and a variable resistor forming a connection between the said local circuits for simultaneously varying the excitation of the said exciters.

2. In a system of control for electric braking, a plurality of dynamo electric machines, at least two of said machines connected to operate as exciters for electric braking, each of the said exciters connected in a separate local circuit with the field windings of a portion of the machines, a resistor common to the said local circuits for varying the braking current, and equalizing connections between the said exciters.

3. In a system of control for electric braking, a plurality of dynamo electric machines, at least two of said machines connected to operate as exciters for the remainder of the machines, each of said exciters connected in a separate local circuit with a substantially equal part of the field windings of the said remainder of the machines, a resistance forming a connection between said local circuits for simultaneously varying the excitation of the said exciters, and equalizing connections between the fields of the exciters for causing the current in the two exciter armatures to be substantially equal.

4. In a system of control for electric braking, a plurality of dynamo electric machines, at least two of said machines connected to operate as exciters for the remainder of the machines, each of said exciters connected in a separate local circuit with a substantially equal part of the field windings of the said remainder of the machines and the field winding of the other exciter, a resistor forming a connection between the said local circuits for simultaneously varying the excitation of the said exciters, and equalizing connections between the field windings of said exciters.

5. In a system of control for electric braking, a plurality of dynamo electric machines, at least two of said machines connected to operate as self-excited exciters for the remainder of the machines, each of said exciters connected in a separate local circuit with a substantially equal part of the field windings of the said remainder of the machines, a variable resistor forming a connection between the said local circuits for simultaneously varying the excitation of the said exciters, and means for varying the excitation of the said exciters responsively to the exchange of current between the said local circuits.

6. In a system of control for electric braking, a plurality of dynamo electric machines, at least two of said machines connected to operate as exciters for the remainder of the machines, each of said exciters supplying the excitation for its separate individual part of the said remainder of the machines, means for varying the excitation of the said exciters inversely to the braking current, and equalizing connections between the said exciters for varying the excitation of one of the exciters in accordance with the generated potential of another exciter.

7. In a system of control for electric braking, a plurality of dynamo electric machines adapted to operate either as series motors for motoring operation or as generators for electric braking, at least two of said machines connected to operate as exciters for the remainder of the machines, the armature of each of said exciters connected to a separate local circuit with a substantially equal part of the field windings of the said remainder of the machines and the field winding of another exciter, and means connecting the said local circuits in parallel relation for varying the braking effect of the said machines.

8. In a system of control for electric braking, a resistor, a plurality of dynamo electric machines, a portion of the armatures of said machines connected in series with the resistor to form a braking circuit, another portion of the armature comprising at least two of the armatures connected in multiple with each other in local shunt circuits to the resistor, each of the said local circuits including field windings of the said machines.

9. In a system of control for electric braking, a plurality of similar dynamo electric machines adapted to act as series motors or as generators, at least two of said machines connected to operate as exciters for the said machines for braking operation, and equalizing connections between the said exciters for compensating for variations in the generated potential of the machines.

10. In a system of control for electric braking, a plurality of dynamo electric machines, at least two of said machines connected to operate as self-excited exciters for the remainder of the machines, each of said exciters connected to supply the excitation for a separate individual part of the said remainder of the machines, means for varying the excitation of the said exciters inversely to the braking current, and equalizing connections between the said exciters for varying the excitation of one of the exciters in accordance with the generated potential of another exciter.

11. In a system of control for a plurality of dynamo electric machines adapted to either operate as series motors or as generators for electric braking, at least two of said machines operating as exciters for electric braking, each of the said exciters connected in a local circuit with the field windings of a portion of the said machines, means forming part of the said local circuits for varying the excitation of the said machines responsively to the braking current, and connections between the field windings of the said exciters for compensating for variations of the generated potential of the machines.

12. In a system of control for a plurality of dynamo electric machines having series fields and adapted to operate either as series motors for motoring operation or as generators for electric braking, at least two of said machines connected to excite the field windings of the remainder of the machines for electric braking, the said exciters connected in multiple with each other and each exciter armature connected in a local circuit with a portion of the field windings of said machines, and equalizing connections between the said exciters.

13. In a system of control for electric braking, a plurality of dynamo electric machines adapted to operate either as series motors for motoring operation or as generators for electric braking, at least two of said machines connected to operate as exciters for the field windings of the remainder of the machines, a resistor, the armatures of the said remainder of the machines connected in series with the said resistor to form a braking circuit, each of the said exciters connected in a separate local circuit with the said resistor, and equalizing connections between the field windings of said exciters for compensating for variations in the generated potential of the exciters.

14. In a system of control for electric braking, a plurality of dynamo electric machines, at least two of said machines connected to operate as exciters for the field windings of the remainder of the machines, each of the said exciters connected in a separate local circuit with a portion of the field windings of the remainder of the machines, means for simultaneously varying at will the excitation of said exciters, means for varying the excitation of said exciters inversely responsively to the value of the braking effect, and equalizing connections between the field windings of said exciters.

15. In a system of control for electric braking, a plurality of dynamo electric machines, at least two of said machines each connected in a local circuit to operate as an exciter for a substantially equal part of the remainder of the machines and for the other exciter, the said remainder of the machines connected in series relation to form a braking circuit, a variable resistor in the said braking circuit forming a multiple connection for the said local circuits and for simultaneously varying the excitation of the said exciters, and equalizing connections between the exciter field windings for equalizing the current in the exciter armatures.

16. In a system of control for electric braking, a plurality of dynamo electric machines, at least two of said machines connected to operate as exciters for the field windings of the remainder of the machines, each of the said exciters connected in a separate local circuit with a portion of the field windings of the remainder of the machines, resistance connected to be traversed by braking current and connected with the field windings of said exciters for varying the excitation of the exciters inversely to the braking effect, a variable resistor common to the said local circuits for simultaneously varying at will the excitation of the said exciters, and equalizing connections between the field windings of said exciters.

17. In a system of control for electric braking, a plurality of dynamo electric machines at least two of said machines connected in parallel relation with each other and each connected to operate as an exciter for a substantially equal part of the remainder of the machines, substantially equal parts of the armatures of the remainder of said machines connected in parallel relation, a resistor in series with each of the said parts of the armatures, the armatures of each of said exciters connected in a separate local circuit with substantially equal parts of the field windings of the said remainder of the machines, a variable resistor for simultaneously varying at will the potential of the said exciters, and connections between the field windings of said exciters for compensating for variations in the generated potential of the exciters and the generated potential of the said parallel connected parts of the armatures of the said remainder of the machines.

18. In a system of control for electric braking, a plurality of dynamo electric machines, at least two of said machines connected to operate as self-excited exciters for the remainder of the machines, substantially equal parts of the armatures of said remainder of the machines being connected in parallel relation, each of said exciters connected in a separate local circuit with a substantially equal part of the field windings of the said remainder of the machines, a variable resisfor forming a connection between the said local circuits for simultaneously varying the excitation of the said exciters, and means for substantially equalizing the current in the armature of the said remainder of the machines, comprising an equalizing connection between the armatures of the remainder of the machines which causes any interchange of current between the armatures of the remainder of the machines to vary the potentials of the said exciters in opposite directions.

19. In a system of control for electric braking, a plurality of dynamo electric machines, at least two of said machines connected to operate as self-excited exciters for the remainder of the machines, substantially equal parts of the armature of said remainder of the machines connected in parallel relation, each of said exciters connected in a separate local circuit with a substantially equal part of the field windings of the said remainder of the machines, a variable resistor forming a connection between the said local circuits for simultaneously varying the excitation of the said exciters, and means for substantially equalizing the current of the armatures of the said remainder of the machines, comprising an equalizing connection between the armatures of the remainder of the machines and the field windings of the said exciters which causes an interchange of current between the armatures of the remainder of the machines to vary the excitation of one exciter in one direction and the excitation of the other exciter in the opposite direction.

In witness whereof, I have hereunto set my hand this 10th day of November, 1922.

PETER W. FORSBERG.